United States Patent [19]
Orbach et al.

[11] Patent Number: 5,884,204
[45] Date of Patent: *Mar. 16, 1999

[54] ACTIVE ROADABILITY CONTROL FOR WORK VEHICLES

[75] Inventors: Abraham Orbach, Naperville; William L. Schubert, Downers Grove, both of Ill.

[73] Assignee: Case Corporation, Racine, Wis.

[*] Notice: This patent issued on a continued prosecution application filed under 37 CFR 1.53(d), and is subject to the twenty year patent term provisions of 35 U.S.C. 154(a)(2).

[21] Appl. No.: 633,135

[22] Filed: Apr. 16, 1996

[51] Int. Cl.$^6$ .............................. E02F 3/76; A01B 63/112
[52] U.S. Cl. ................................. 701/50; 172/2; 172/4.5; 172/9
[58] Field of Search ........................ 364/424.07, 423.098; 172/1, 2, 7, 8, 3, 4, 9, 826; 91/361, 367, 435, 518, 522; 180/237, 14.2, 14.6, 246, 248; 701/50

[56] References Cited

U.S. PATENT DOCUMENTS

| | | | |
|---|---|---|---|
| 3,918,527 | 11/1975 | Wagner | 172/9 |
| 4,427,075 | 1/1984 | Romes | 172/7 |
| 4,437,048 | 3/1984 | Arnold | 701/50 |
| 4,502,708 | 3/1985 | Taplin | 260/755 |
| 4,518,044 | 5/1985 | Wiegardt et al. | 364/424.07 |
| 4,667,744 | 5/1987 | Kauss et al. | 172/2 |
| 4,677,542 | 6/1987 | Kasten | 172/9 |
| 4,800,721 | 1/1989 | Cemenska | 364/190 |
| 4,924,943 | 5/1990 | Maichle | 172/1 |
| 4,933,853 | 6/1990 | Musil et al. | 701/50 |
| 4,969,527 | 11/1990 | Boe et al. | 364/424.07 |
| 4,979,092 | 12/1990 | Bergene et al. | 364/424.07 |
| 5,040,119 | 8/1991 | Hardly et al. | 701/50 |
| 5,065,326 | 11/1991 | Sahm | 364/424.07 |
| 5,143,159 | 9/1992 | Young et al. | 701/50 |
| 5,155,326 | 10/1992 | Sheehan | 56/15.1 |
| 5,245,826 | 9/1993 | Roth et al. | 60/413 |
| 5,320,186 | 6/1994 | Strosser et al. | 172/8 |
| 5,333,533 | 8/1994 | Hosseini | 91/361 |
| 5,421,416 | 6/1995 | Orbach et al. | 701/50 |
| 5,469,921 | 11/1995 | Orbach et al. | 701/50 |
| 5,472,056 | 12/1995 | Orbach | 701/50 |
| 5,549,166 | 8/1996 | Orbach et al. | 364/424.07 |

FOREIGN PATENT DOCUMENTS

| | | |
|---|---|---|
| 0 090 971 | 10/1983 | European Pat. Off. . |
| 0 299 223 | 1/1989 | European Pat. Off. . |
| 0 433 669 | 6/1991 | European Pat. Off. . |
| 34 46 811 | 7/1986 | Germany . |

*Primary Examiner*—Jacques H. Louis-Jacques
*Attorney, Agent, or Firm*—Foley & Lardner

[57] ABSTRACT

A system for reducing oscillations of an implement carried by a vehicle in a lifted position during travel. The implement is coupled to an implement positioning system including an actuator for raising and lowering the implement in response to a control signal. The system includes at least one load sensor for sensing implement load, a position sensor for sensing implement position, and a control circuit configured to generate a control signal to the actuator in a first manner based at least upon implement position and in a second manner based at least upon implement load. The control circuit transitions from the first manner of operation to the second manner of operation upon detecting oscillations of the implement beyond a predetermined magnitude. The control circuit improves roadability of the vehicle by operating in a roadability mode including the first and second manners of operation wherein the roadability mode is entered based at least upon the implement being in a lifted position and vehicle speed being greater than a predetermined threshold speed.

35 Claims, 7 Drawing Sheets

ROADABILITY MODE

NON-ACTIVE ROADABILITY MODE

ACTIVE ROADABILITY MODE

ACTIVE ROADABILITY CONTROL FOR WORK VEHICLES

FIELD OF THE INVENTION

The present invention relates generally to the field of control systems for agricultural implements. More particularly, the invention relates to a system for reducing oscillations of an implement carried by a vehicle during travel wherein a control signal is generated in a first manner based at least upon implement position and in a second manner based at least upon implement load.

BACKGROUND OF THE INVENTION

A number of known control arrangements regulate the position or elevation of implements, such as plows, attached to or drawn by agricultural vehicles. Such control systems generally sense the position of a three-point hitch and compare this position to a command or desired position set by an operator. The control system compares the sensed implement position to the command position and generates a control signal to an actuator to vertically move the hitch, along with the implement mounted on it, to the desired elevation.

Control systems can also operate based on draft force. For example, the control system disclosed in U.S. Pat. No. 5,421,416, filed Sep. 8, 1993, commonly assigned with the present invention and incorporated herein by reference, controls the position of a ground penetrating implement based at least in part on the draft force encountered when the implement interacts with the ground.

Agricultural vehicles equipped with known control systems can experience oscillations when the vehicle travels at high speeds across roads or between fields. The vehicle operator commands the implement to a lifted position during travel. At high speeds, the implement can oscillate or bounce due to, for example, bumps or depressions in the road or the field. The interaction of an oscillating implement with the vehicle can cause an uncomfortable ride for the operator and can cause the vehicle's front wheels to leave the road or field surface. Severe oscillations can create an undesirable condition in which the implement may approach the road or the field during transport. To compensate for the phenomena of implement oscillations, the operator may reduce the vehicle's intended travel speed. The reduced travel speed lowers the operator's productivity.

U.S. Pat. No. 4,924,943, filed Mar. 24, 1989, discloses a control system for an agricultural vehicle which provides for active damping of implement vibrations which occur when the vehicle travels around a curve with the implement raised. When the vehicle travels around a curve, part of the implement weight normally resting on the draft load force pins is shifted by side guiding members onto the housing of the tractor. This causes the force sensed by the draft load force pins to decrease. At the end of the curve, the sensed force increases as the implement weight is shifted back onto the draft load force pins. The disclosed control system uses active damping based upon a dynamic force signal to reduce the disturbing influence of the side guiding members during turning.

SUMMARY OF THE INVENTION

The invention features an innovative system for reducing oscillations of an implement carried by a vehicle in a lifted position during travel. In particular, the invention provides improved roadability of a vehicle, such as a tractor, construction vehicle or the like, carrying an implement in a lifted position during travel via a control system which operates in a roadability mode based at least upon the implement being in the lifted position and vehicle speed being greater than a predetermined threshold. The system is applicable to both fully and semi-mounted implements, which may be mounted on the rear or the front of the vehicle.

In accordance with a first aspect of the invention, a system is provided for reducing oscillations of an implement carried by a vehicle in a lifted position during travel. The implement is coupled to an implement positioning system including an actuator for vertically moving the implement in response to a control signal. The system includes at least one load sensor for sensing load exerted by the implement on the implement positioning system, a position sensor for sensing position of the implement, and a control circuit coupled to the load sensor, the position sensor and the actuator. The control circuit is configured to operate in a first manner wherein the control circuit generates the control signal for moving the actuator based at least upon sensed implement position and in a second manner wherein the control circuit generates the control signal for moving the actuator based at least upon sensed implement load.

In accordance with another feature of the invention, a system is provided for improving roadability of a vehicle system including an implement carried by a vehicle in a lifted position during travel. The implement is coupled to an implement positioning system including an actuator capable of vertically moving the implement in response to a control signal. The system includes a position sensor for sensing position of the implement, a speed sensor for sensing speed of the vehicle, and a control circuit coupled to the position sensor, the speed sensor and the actuator. The control circuit is configured to operate in a roadability mode for reducing oscillations of the implement based at least upon the implement being in the lifted position and vehicle speed being greater than a predetermined threshold speed.

In accordance with still another aspect of the invention, a system is provided for improving roadability of a vehicle carrying an implement in a lifted position during travel. The implement is coupled to an implement positioning system including an actuator capable of vertically moving the implement in response to a control signal. The system includes means for sensing load exerted by the implement on the implement positioning system, means for sensing position of the implement, and control means coupled to the load sensing means, the position sensing means, and the actuator. The control means is configured to generate the control signal for moving the actuator in a first manner and a second manner when the sensed implement position and vehicle speed indicate that the implement is in a lifted position during travel. The control means generates the control signal in the first manner when oscillations of the implement are not detected and in the second manner when oscillations of the implement are detected.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENT

Before proceeding to the Detailed Description of the Preferred Embodiments, several general comments can be made about the applicability and the scope of the invention. First, while reference is made throughout the following discussion to positional control of an implement mounted to a tractor hitch assembly, it should be understood that the present control system is more generally applicable to implement position control in general. Thus, control systems employing the elements recited in the appended claims and used to position an implement other than on a conventional tractor hitch, such as a trailed or towed implement, are equally within the intended scope of the invention. Second, while the preferred embodiment described below incorporates a hydraulic system, including valving and a hydraulic actuator for positioning the implement, other types of implement positioning systems could be used where appropriate, such as systems including electrical actuators and the like.

Figure 1:
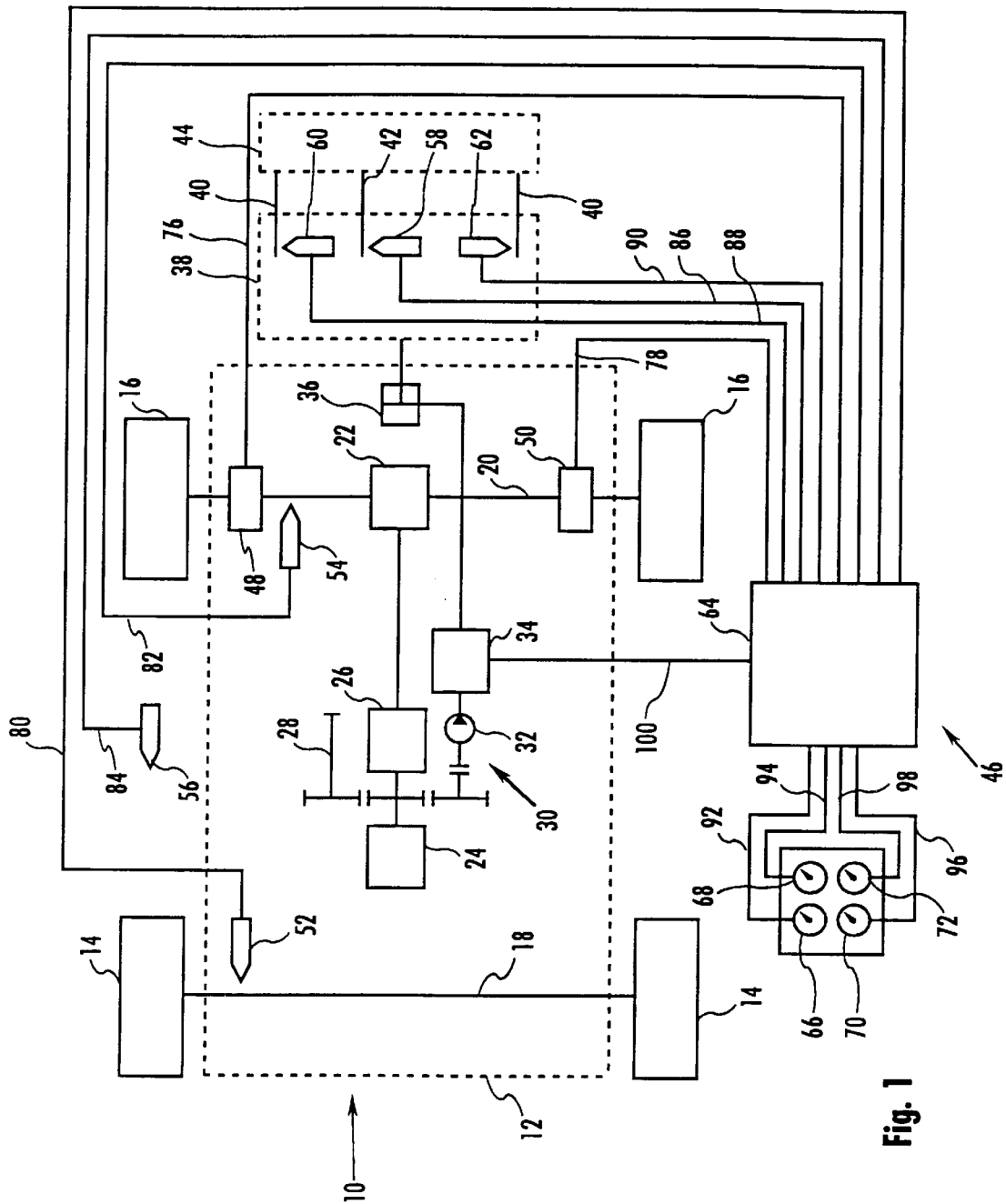
FIG. 1 is a diagrammatical representation of a tractor equipped with a control system for positioning an implement in response to a plurality of operating parameters including implement load and position.

Turning now to the FIGURES and referring first to FIG. 1, a vehicle 10, such as an agricultural tractor, is illustrated diagrammatically as including a body 12 carried by front wheels 14 and rear wheels 16. Front wheels 14 are mounted in a conventional manner on an axle 18 and rear wheels 16 are mounted on a rear axle 20 coupled to a differential 22. Tractor 10 also includes a power plant or engine 24 coupled through a transmission 26 to differential 22 such that engine 24 may selectively drive rear wheels 16 in a number of forward and reverse gears. Tractor 10 typically includes auxiliary systems coupled to engine 24, such as a power take off shaft 28 for driving implements and other detachable equipment. Other on-board systems may include front wheel drive gearing and corresponding automatic control, and differential locking components for selectively locking rear and/or front differentials. The tractor is further described in incorporated U.S. Pat. No. 5,421,416.

A hydraulic system 30 is coupled to engine 24 to provide a source of pressurized fluid for powering various actuators. As illustrated in FIG. 1, hydraulic system 30 includes a hydraulic pump 32 piped to a fluid reservoir (not shown) and to valving 34 for regulating and directing pressurized fluid to various hydraulic components. One such component is illustrated in FIG. 1 in the form of a linear actuator or double-acting cylinder 36 coupled to a hitch assembly 38. Hitch assembly 38 may be a conventional three-point hitch having lower and upper hitch links 40 and 42 for supporting a working implement 44, such as a plow. Moreover, valving 34 preferably includes solenoid operated proportional valves for directing a flow of pressurized fluid to actuator 36 for raising and lowering hitch assembly 38 and implement 44 as commanded by an operator or control system as described below, such as to vary the penetration of implement 44 into ground being worked. Valving 34 can also be used to raise hitch assembly 38, along with implement 44, to a lifted position wherein the implement is not engaged in a working position with the ground. A lifted position may be commanded by the operator or control system during travel of tractor 10 across a road or between fields. Typically, the lifted position corresponds to implement 44 being in a raised position at a distance above the ground to allow implement 44 a range of movement without engaging the ground. The distance is generally sufficient to allow implement 44 to move or bounce in response to influences such as bumps or depressions in the road or field. Moreover, a lifted position as referred to herein may situate implement 44 in a location below the fully raised position since, for example, the weight of implement 44 may prevent implement 44 from being fully raised. In general, implement 44 is in a lifted position when not engaged in a working position with the ground, and certain implements may include a wheel or support (not shown) coupled to the implement that remains in contact with the ground while the implement is in a raised position.

It should be noted that, while throughout the following description reference is made to an agricultural tractor carrying a fully mounted implement on a rear hitch assembly, the system described herein is not limited to such applications or equipment. For example, the system may find application on other types of equipment, such as construction equipment, and may be employed to improve roadability for both front and rear mounted implements, as well as for both fully and semi-mounted implements. Such applications might include loaders carrying buckets, combines carrying headers and the like, wherein roadability tends to be hampered by oscillations of the implement on the vehicle.

As illustrated in FIG. 1, tractor 10 is equipped with a control system, designated generally by the reference numeral 46 for controlling the position of hitch assembly 38 and implement 44. While control system 46 may include more or fewer of the elements shown in FIG. 1, it may typically include brake sensors 48 and 50 coupled to the rear service brakes of tractor 10, speed sensors 52 and 54 coupled to the front and rear axles 18 and 20 respectively, a true ground speed sensor 56 (e.g., a radar-based speed sensor or non-powered wheel speed sensor in a 2-wheel drive tractor), a hitch position sensor 58 and draft load force sensors 60 and 62. Control system 46 also includes a control circuit 64 and command devices 66, 68, 70 and 72 (described below) which may be provided on a single or multiple control consoles 74 in the tractor cab (not shown). While draft load force sensors 60 and 62 are preferably conventional draft pins, other sensors may be used to generate signals representative of load, such as accelerometers or pressure transducers (e.g. coupled to cylinder 36 or to another portion of the hydraulic system). Moreover, it should be understood that, while sensors 60 and 62 are referred to herein as "draft" sensors, which, when the vehicle is an agricultural tractor, will typically be the same sensors provided for detection of draft force during ground-working operations, on other types of vehicle these sensors may be used to sense other operational parameters, such as loads on a combine header, or may be provided for the sole purpose of improving roadability of the vehicle/implement system.

In operation, brake sensors 48 and 50 detect the application of the tractor service brakes and generate braking signals upon application of the brakes. These braking signals are applied to control circuit 64 via conductors 76 and 78 respectively. Of course, for control systems employing control routines that do not make use of braking signals, sensors 48 and 50 may be omitted. Speed sensors 52 and 54, which may include a variable inductance magnetic pickup, detect the rotational velocity of front wheels 14 and rear wheels 16, respectively, and generate speed signals representative thereof. These speed signals are transmitted to control circuit 64 via conductors 80 and 82. True ground speed sensor 56 is typically a radar device mounted to the body 12 of tractor 10 and configured to emit radar signals toward the ground and to receive a portion of the signals rebounding from the ground to determine the speed of travel of tractor 10. Sensor 56 then generates a speed signal representative of the tractor speed and transmits this signal to control circuit 64 via conductor 84.

The signals produced by sensors 48 through 56 are used as inputs by control circuit 64 to regulate various functions of tractor 10 in accordance with preset, cyclical control routines. For instance, braking signals from sensors 48 and 50 may be used to control engagement and disengagement of a locking circuit for differential 22. Speed signals from sensors 52, 54 and 56 may be used to calculate a driven wheel slip value for use in controlling implement position. Moreover, it should be understood that other, additional sensors may be provided on tractor 10 for additional control routines. For example, such sensors might provide signals indicative of engine speed for use in regulating engine throttling or implement position as desired. Moreover, it should be understood that the various control functions required for operation of tractor 10, including the implement control functions discussed below, may be executed by a single control circuit 64 or by separate, dedicated control circuits taking as inputs only the parameter signals necessary for their precise function.

Control of the position of implement 44 is generally based upon information relating to the sensed implement position and draft load force. This information is provided via position sensor 58 and draft load sensors 60 and 62. Thus, position sensor 58, which is typically a rotary or linear potentiometer or linear variable differential transformer (LVDT) coupled to a linkage 42 of the tractor hitch assembly 38, detects the position or elevation of implement 44 and generates a position signal representative thereof This position signal is conveyed to control circuit 64 via a conductor 86. Draft load sensors 60 and 62, which typically include resistance strain gauges applied to links 40 of hitch assembly 38, generate draft load signals representative of the force exerted on links 40. These draft load signals are transmitted to control circuit 64 via conductors 88 and 90, respectively. Thus, control circuit 64 receives signals representative of both the position of implement 44 and either the draft force generated by interaction of implement 44 with the ground or, when implement 44 is in a lifted position, the load exerted by implement 44 on links 40. Alternatively, dedicated load sensors separate from draft load force sensors 60 and 62 could be provided on tractor 10 for measuring the load exerted by implement 44 on the right and left sides of the hitch assembly 38. When tractor 10 is stopped and implement 44 is in a lifted position, the load sensed by sensors 60 and 62 is representative of the weight of the implement. During travel of tractor 10 with implement 44 in a lifted position, the load sensed by sensors 60 and 62 is representative of the weight of implement 44 as modified by dynamic forces exerted by implement 44 on the hitch assembly 38, such as forces due to accelerations and oscillations of implement 44.

In addition to sensed values of the operating parameters discussed above, control circuit 64 receives command or reference values from command devices 66, 68, 70 and 72, which typically include potentiometers and switches positionable via suitable knobs or handles (not shown). For the purposes of implement position control, command device 66 provides an implement position command signal representative of the desired position of implement 44, and includes a position corresponding to a fully lifted position. Command device 68 provides a draft command value representative of the desired level of draft force on implement 44. Command device 70 is an operator adjustable upper limit selector for setting the upper limit of implement position. Finally, command device 72 is an implement position override switch that includes a working position and a lifting position. Other command devices could provide other command inputs for control of various functions of tractor 10, such as a desired level of wheel slip. Signals from devices 66, 68, 70 and 72 are applied to control circuit 64 via conductors 92, 94, 96 and 98, respectively. Based upon the reference values supplied by command devices 66 through 72 and upon the sensed values from sensors 48 through 62, control circuit 64 generates control signals for raising and lowering implement 44 and applies these control signals to valving 34 via conductor 100 to move actuator 36.

Figure 2:
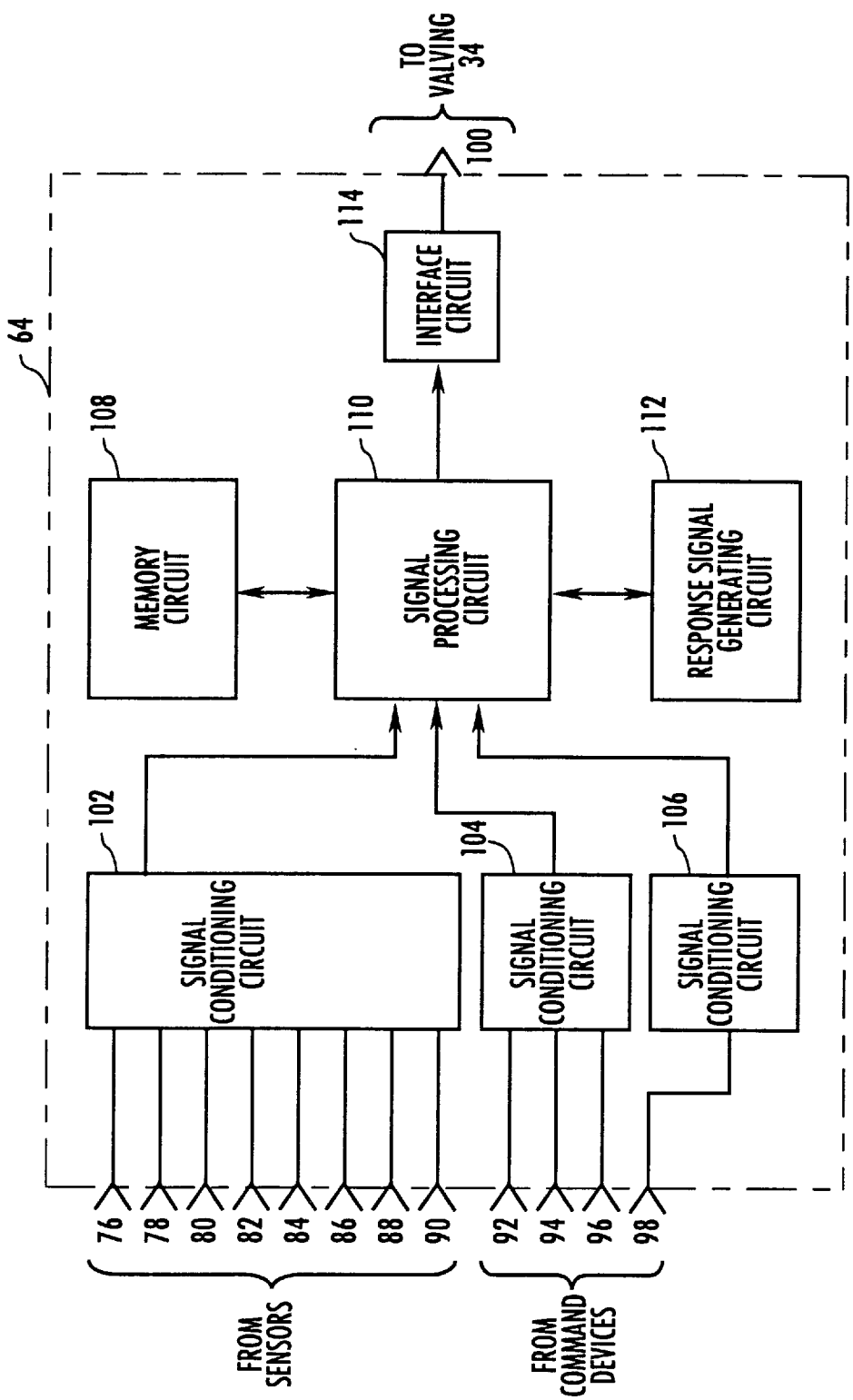
FIG. 2 is a block diagram illustrating certain of the principal circuits included in the controller for the system shown in FIG. 1.

Certain of the sub-circuits included in control circuit 64 are illustrated diagrammatically in FIG. 2. Control circuit 64 includes signal conditioning circuits 102, 104 and 106, a memory circuit 108, a signal processing circuit 110, a response signal generating circuit 112 and an output signal interface circuit 114. While these various circuits are illustrated in FIG. 2 as separate, interconnected elements, it should be understood that all or some of these circuits may be included in a single integrated circuit and may comprise internal circuitry of an appropriately configured (e.g., programmed) microprocessor.

Input signals transmitted from sensors to control circuit 64 via conductors 76 through 90 are applied to signal processing circuit 110 through signal conditioning circuit 102, which will typically include an analog-to-digital converter and appropriate isolation, depending upon the type of sensors utilized and the nature of the signals produced. Similarly, signals transmitted from command devices to control circuit 64 via conductors 92, 94 and 96 are applied to signal processing circuit 110 via signal conditioning circuit 104, which may be substantially identical to circuit 102 and generally includes an analog-to-digital converter. Moreover, circuits 102 and 104 may be a single circuit. Circuits 102 and 104 receive the input signals from the sensors and command devices, produce digital signals or values representative of the various input signals and apply these values to signal processing circuit 110. Circuit 106 receives command input signals from other command devices, such as from device 72 via conductor 98, which generally produces discrete (e.g., on/off) signals for controlling operation of signal processing circuit 110. Circuit 106 typically includes a multiplexer and appropriate isolation, permitting signal processing circuit 110 to select and access signals applied to circuit 106.

Memory circuit 108 preferably includes both volatile and non-volatile memory, such as random access memory (RAM), electronically programmable read only memory (EPROM) and electronically erasable programmable read only memory (EEPROM), or any other type of memory that can be rewritten, such as flash memory. The volatile memory of circuit 108 is generally used to store various parameter and intermediate values used during the control functions of signal processing circuit 110. Non-volatile memory, such as EPROM or flash memory, serves to store the cyclic control routine implemented by signal processing circuit 110, while other non-volatile memory, such as EEPROM, serves to store the calibration values and failure codes indicative of failure or non-responsiveness of system components. Response signal generating circuit 112, which will typically be included in the circuitry of signal processing circuit 110, but is illustrated as a separate circuit here for explanatory purposes, receives values representative of sensed implement position and sensed implement draft or load and generates a response signal to control the movement of implement 44 as described more fully below. This response signal is applied to signal processing circuit 110 to adjust control signals generated by circuit 110. These adjusted control signals, in the form of pulse-width-modulated (PWM) output signals, are applied to output signal interface circuit 114, which includes appropriate valve drivers for energizing the solenoids of valving 34 and thereby to move actuator 36 in the desired direction and at a desired rate. It should be noted that the adjusted control signals produced by circuit 110 could have forms other than PWM signals and, where actuators other than hydraulic cylinders and the like are used for moving the implement, these control signals are, of course, adapted for the particular actuator type used.

Figure 3:
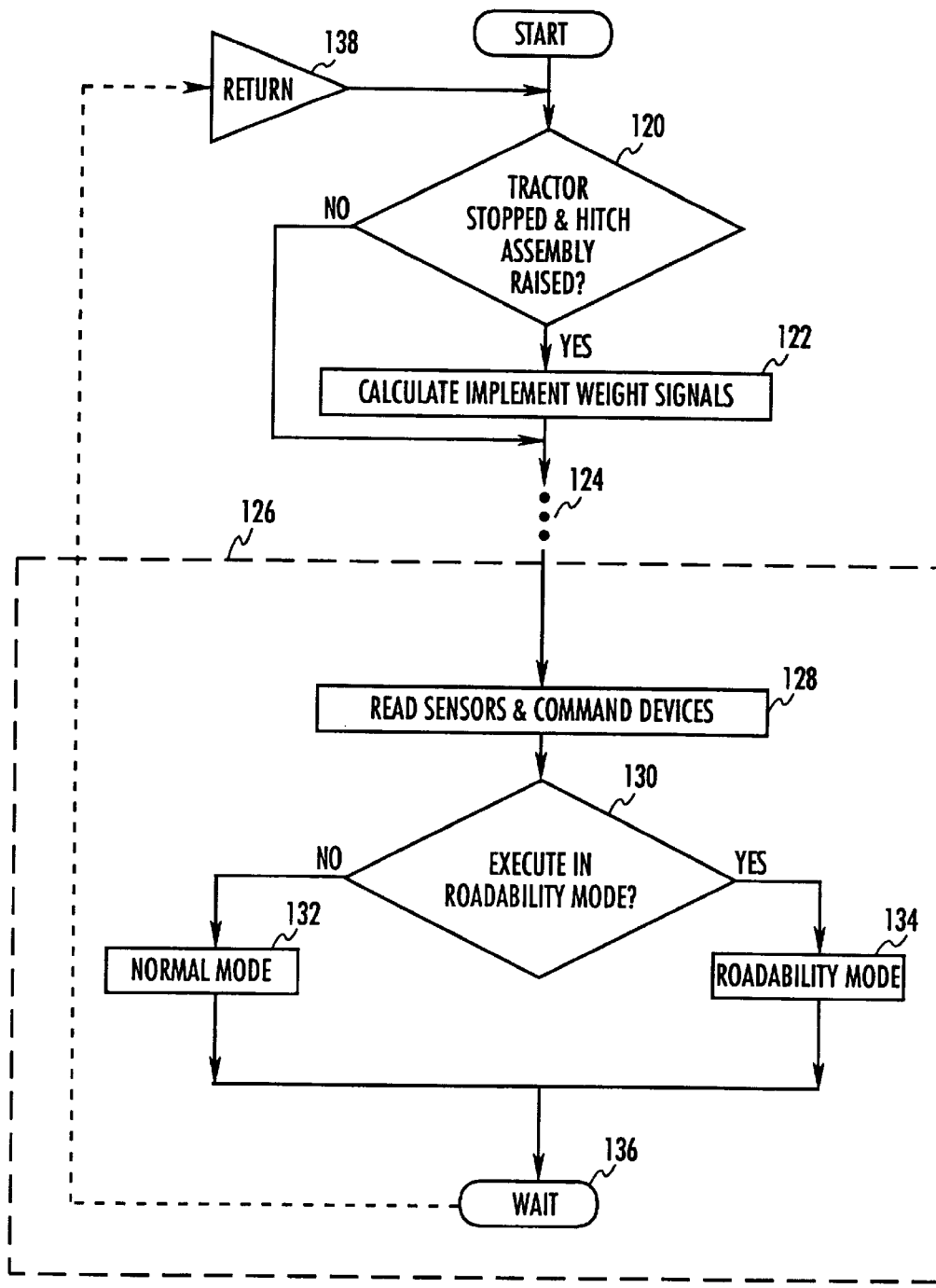
FIG. 3 is a flow chart generally representing typical control logic implementing an implement control approach having a normal mode and a roadability mode of operation.

Referring to FIG. 3, a flowchart shows that control circuit 64 determines signals representative of implement weight before entering the cyclic control routine for implement position control. To determine these weight signals, tractor 10 must be stopped and hitch assembly 38 must be in a raised position as illustrated at step 120. Control circuit 64 generally verifies these conditions by reference to a speed signal from one of the speed sensors 52, 54 or 56 and to a position signal from position sensor 58. When these conditions are met, control circuit 64 detects load signals generated by draft load sensors 60 and 62 and calculates an implement weight signal representative of the weight of implement 44 carried by tractor 10 as shown at step 122. The implement weight signal is generally calculated as the arithmetic sum of the right and left implement weight signals. While the load signals need not normalize or directly measure implement weight, they provide weight signals representative of (e.g., proportional to) the weight of implement 44. Once the weight signals are calculated, they are stored in memory circuit 108 and are essentially constant during the operation of tractor 10.

After calculating the implement weight signals, control circuit 64 may execute various additional logic as indicated by reference numeral 124 before entering the cyclical control routine illustrated by reference numeral 126. It should be noted that the implement weight signals generated at step 122 could be calculated during a calibration procedure and stored in a non-volatile portion of memory circuit 108, such as EEPROM, for later use. Alternatively, control circuit 64 could calculate the implement weight signals as part of the cyclical control routine 126 when the conditions at step 120 are met. In addition, if implement weight was known in advance, control circuit 64 could be pre-programmed with the implement weight signals and steps 120 and 122 would be unnecessary.

Upon entering the cyclical control routine at reference numeral 126, control circuit 64 reads sensors 48 through 62 and command devices 66 through 72 as shown at step 128. Although FIG. 3 shows these inputs being read together, control circuit 64 may also be configured to read the sensors and command devices as needed by the logic. At step 130, control circuit 64 uses the sensor and command device inputs to decide whether to control the position or elevation of implement 44 in a normal mode 132 or a roadability mode 134. The operation in these modes is described below. Alternatively, control system 46 could be equipped with a switch under operator control to select roadability mode. After executing one of these modes, control circuit 64 waits at step 136 for the next cycle of the cyclic control routine 126. In a preferred embodiment, control system 46 includes a timer (not shown) to generate an interrupt at periodic intervals (e.g., 10 msec) to an appropriately configured microprocessor. As shown at step 138, the microprocessor returns from the interrupt at the beginning of the cyclic control routine upstream of step 120.

In the normal mode, shown at step 132, control circuit 64 monitors the command or reference values for operational parameters, such as load, position, wheel slip and the like, from command devices 66 and 68. These values are filtered and compared to sensed values from sensors 58, 60 and 62 in accordance with a cyclic control routine. A number of such routines, following a variety of control schemes, are known in the art and do not, in themselves, form part of the present invention. While different manufacturers, may utilize different control routines, depending upon the type and class of vehicle being controlled and upon the parameters governing implement movement, these routines typically generate control signals for moving the implement up or down depending upon the deviation of the sensed values for at least the draft force and the implement position from the reference or command values for those parameters. A routine that generates control signals based upon the deviation of the sensed draft force from the reference draft force implements a draft control mode. Moreover, these routines may select the greater of two or more parameter error values or combine two or more parameter error values to generate the implement control signals. However, commonly available systems of this type ultimately generate control signals in the form of PWM signals, the duty cycle of which is proportional to the error signal forming the basis for control. These PWM signals are then applied, through an appropriate valve driver, to the solenoid of a proportional hydraulic valve to raise or lower the implement at a rate proportional to the PWM control signal duty cycle.

The rate of response of control system 46 to deviations in the sensed draft force from the reference draft force is adjusted automatically by control system 46. A preferred method of adjusting the response rate is to generate a response signal limit representing the maximum PWM duty cycle of the control signals which may be applied to valving 34 by control circuit 64 and limiting or clipping control output signals to a magnitude equal to or below the limit. Because the flow rate of pressurized fluid applied to actuator 36 through valving 34 is proportional to this PWM duty cycle, limiting the duty cycle effectively limits the flow rate of fluid to the actuator, thereby limiting the maximum rate of movement of implement 44.

Figure 4:
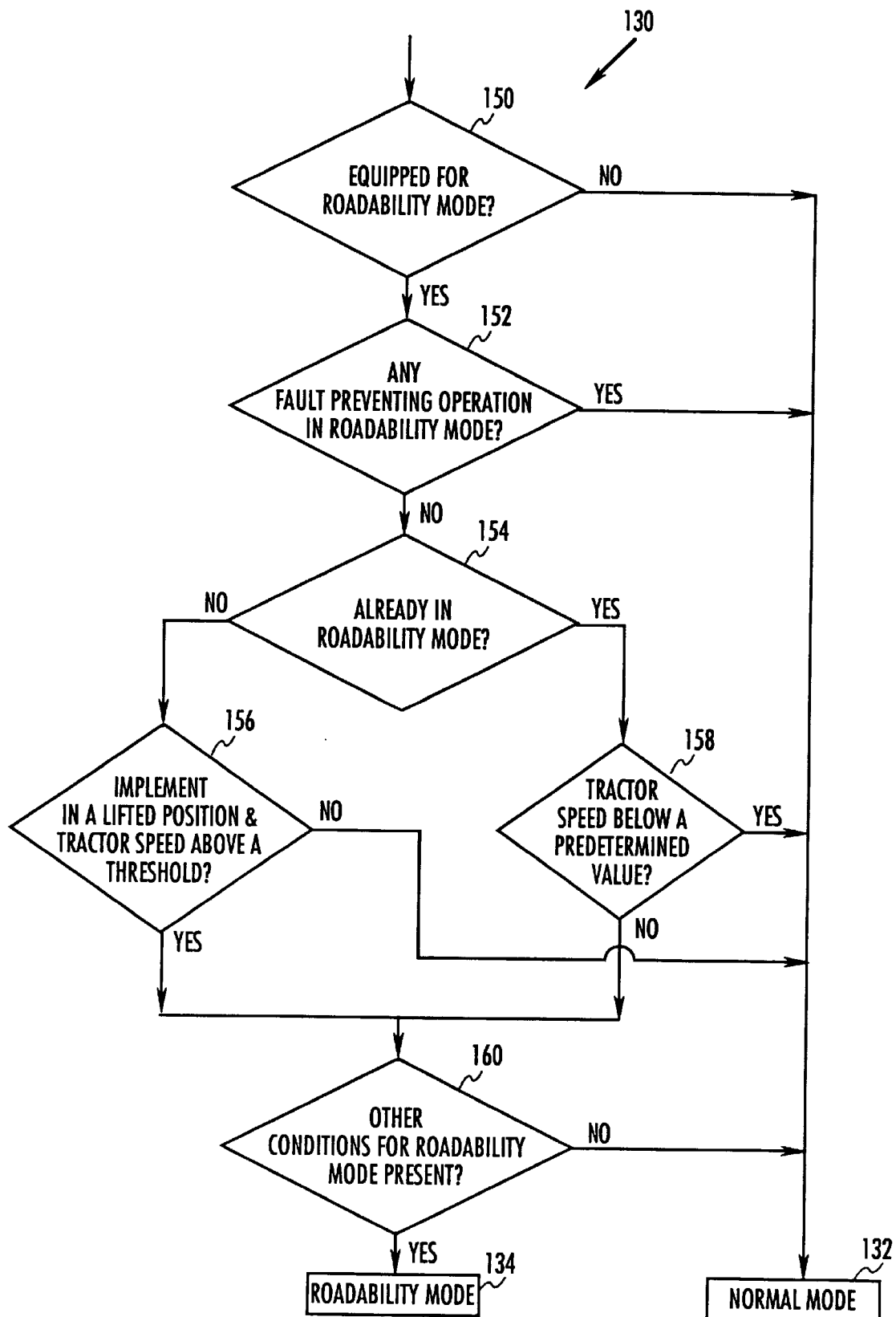
FIG. 4 is a flow chart generally representing the conditions used by the control circuit to decide whether to control implement position in the normal mode or the roadability mode.

The conditions used by control circuit 64 at step 130 to decide whether to control implement position in normal mode or roadability mode is generally shown in FIG. 4. As shown at step 150, control circuit 64 can control the position or elevation of implement 44 in roadability mode only if control system 46 is equipped with load sensors 60 or 62. Although roadability mode generally makes use of load sensors, which may serve as draft sensors for vehicles equipped for draft control, roadability mode is differentiated from normal control modes including a draft control mode. Draft control mode, described above, is used during the normal mode of operation to control implement position based upon deviations in the sensed draft force from the reference draft force set by command device 68 when implement 44 is in a working position. Roadability mode, in contrast, is a separate control mode used to reduce oscillations of an implement in a lifted position during travel. In addition, control circuit 64 is prevented from entering roadability mode, or is required to exit roadability mode, at step 152 if draft load sensors 60 and 62 are both faulty (or if the only draft load sensor in a single sensor system is faulty), or if other system faults prevent the operation of roadability mode (e.g., a faulty position sensor 58). If control system 46 is not equipped for roadability mode, or if any fault preventing operation in roadability mode occurs, control circuit 64 controls implement position in normal mode 132.

If control system 46 is equipped with draft load sensors 60 or 62, and there are no system faults preventing operation in roadability mode, control circuit 64 determines if the control system is already operating in roadability mode at step 154. If not, control circuit 64 checks at step 156 whether roadability mode should be enabled based at least upon implement 44 being in a lifted position and the speed of tractor 10 being greater than a predetermined threshold speed. In a preferred embodiment, control circuit 64 requires actual implement position to be in a predetermined relationship with the upper limit set by command device 70, such as within close range to the upper limit, and preferably within 2% of the upper limit (measured over the total travel range of the implement), with the upper limit set at a maximum raised position. If this condition cannot be met, the system is disabled from entering into the roadability mode of operation. The predetermined threshold speed of tractor 10 is a speed at which implement oscillations become troublesome. This speed can be set and stored in a variety of ways. For example, the threshold speed may be set depending upon the type and class of vehicle being controlled, upon the results of a calibration procedure or upon a command from the operator. The predetermined threshold speed could also be set as a function of other control parameters. The threshold speed could also be pre-programmed at a constant value such as 10 mph or approximately 16 kph. The threshold speed may be stored in RAM, EPROM or EEPROM within memory circuit 108, or may be stored in any other memory available to control circuit 64 (e.g., an internal microprocessor register).

If control system 46 is already operating in roadability mode, control circuit 64 is configured to exit roadability mode (in addition to exiting roadability mode upon various failure conditions at step 152) if the speed of tractor 10 decreases below a predetermined value as shown at step 158. The predetermined value can be set to the threshold speed for entering roadability mode less a hysteresis value, such as 10 mph for entering roadability mode and 9 mph for exiting. Moreover, although control circuit 64 enters roadability mode only when implement 44 is in a lifted position, control circuit 64 does not exit roadability mode based upon implement position. This non-symmetry prevents control circuit 64 from erroneously exiting roadability mode as implement 44 oscillates so that implement position is no longer in the predetermined relationship with the upper limit set by command device 70 (e.g., implement position becomes less than 2% below the upper limit). Instead, control circuit 64 remains in roadability mode as implement 44 oscillates in order to provide roadability control as explained in detail below.

As shown at step 160, control circuit 64 can require the presence of other conditions before entering roadability mode. For example, in a presently preferred embodiment, control circuit 64 requires that the implement position command from command device 66 be in a predetermined relationship to a fully lifted position of implement 44, such as a position command corresponding to a maximum lifted position. In addition, control circuit 64 requires that the implement position override from command device 72 be in the lifting position. Moreover, control circuit 64 requires that the upper limit setting from command device 70 be in a predetermined relationship to a fully lifted position of implement 44 to insure that implement 44 remains above the ground during travel. The predetermined relationship could be an upper limit corresponding substantially to a maximum lifted position, or an upper limit within 10% of the maximum lifted position. Requiring an upper limit near maximum to enable roadability prevents an operator from inadvertently allowing implement 44 to penetrate the ground during travel by insuring that implement 44 has adequate ground clearance. Control circuit 64 could also require any combination of these conditions in order to enter roadability mode.

The absence or change of any condition used to enter roadability mode (other than implement position as mentioned above) can also cause control circuit 64 to exit roadability mode. In the embodiment described above, control circuit 64 exits roadability mode if the implement position command from command device 66 no longer bears the predetermined relationship to a fully lifted position of implement 44, or if the implement position override from command device 72 changes to the working position, or if the upper limit setting from command device 70 no longer bears the predetermined relationship to a fully lifted position of implement 44.

Figure 5:
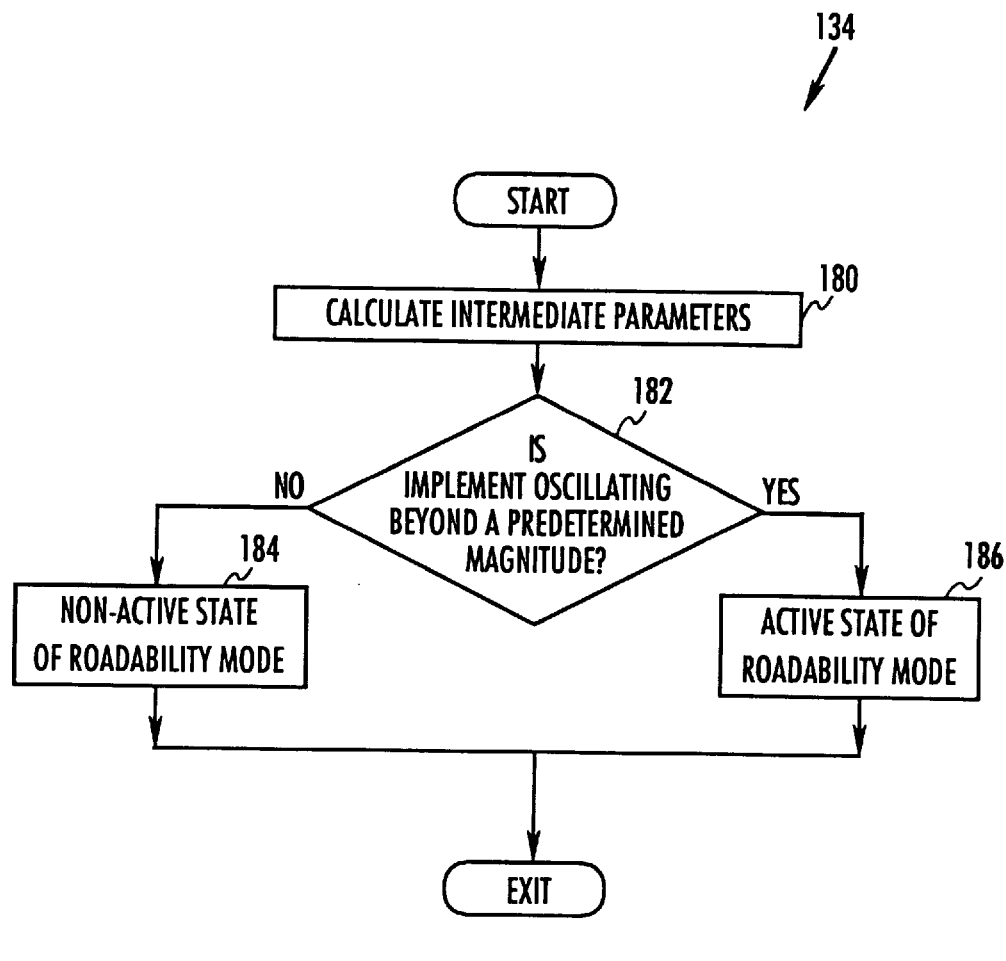
FIG. 5 is a flow chart generally representing typical control logic implementing a roadability mode of operation having a non-active state and an active state.

Referring to FIG. 5, control circuit 64 can operate in a first manner and a second manner when in the roadability mode of step 134. The first manner of operation is a non-active state 184 wherein control circuit 64 generates control signals applied to valving 34 via conductor 100 to move actuator 36 based at least upon sensed implement position. The second manner of operation is an active state 186 wherein control circuit 64 generates control signals based at least upon sensed implement load. The non-active state 184 is the main state from which control circuit 64 occasionally transitions to the active state 186 and then, when action is complete, transitions back to the non-active state.

Control circuit 64 transitions from the non-active state 184 to the active state 186 of roadability mode upon detecting oscillations of implement 44 beyond a predetermined magnitude at step 182. However, control circuit 64 calculates several intermediate parameters at step 180 before checking for implement oscillations. Although FIG. 5 shows the intermediate calculations as part of roadability mode, control circuit 64 can also calculate these values outside of roadability mode. The first intermediate parameter is total draft load error calculated as the difference between the total draft load (i.e., the arithmetic sum of the right and left draft load signals read at step 128) and total implement weight calculated at step 122. The next intermediate parameters represent the change in right and left draft load over time (i.e., derivatives) calculated as the difference between successive measurements of the right draft load sensor and the left draft load sensor, respectively, as control circuit 64 executes cyclical control routine 126.

After calculating the intermediate parameters at step 180, control circuit 64 determines if implement 44 is oscillating beyond a predetermined magnitude based upon two conditions at step 182. The first condition is that total draft load error exceeds a minimum value. The minimum value is set high enough to avoid transition into active mode due to normal acceleration forces exerted by implement 44 on hitch assembly 38 during travel, but low enough so that, once oscillations of implement 44 reach a predetermined magnitude, total draft load error exceeds the minimum value. In a single draft load pin system, the minimum value compared to the total draft load error is different. The second condition for detecting excessive oscillations of implement 44 is that both right and left draft loads be increasing or decreasing at the same time (i.e., both the right and left draft derivative signals are positive or negative). This condition avoids erroneous transition into active state 186 due to travel around curves. If implement 44 is not oscillating when tractor 10 travels around a curve, the force exerted by implement 44 on hitch assembly 38 may increase on one side of tractor 10 and decrease on the other side. Requiring that both right and left draft loads be increasing or decreasing at the same time prevents false triggering of the active state. However, if implement 44 oscillates due to, for example, bumps or depressions in the road or field, both the right and left draft loads may increase or decrease at the same time. This may occur during travel in a straight line, and may also occur during travel around a curve if the oscillations are severe enough to counteract forces due to the curve alone. In a single draft load pin system, the second condition may be satisfied automatically since a single draft load always changes in the same direction.

Step 182 may also include additional logic to avoid erroneous transition out of active state 186 due to changes in the draft load signals over a complete oscillation cycle. The additional logic may include filtering the draft load signals or applying a time delay before exiting active state 186 when the conditions for entering it are no longer met.

Figure 6:
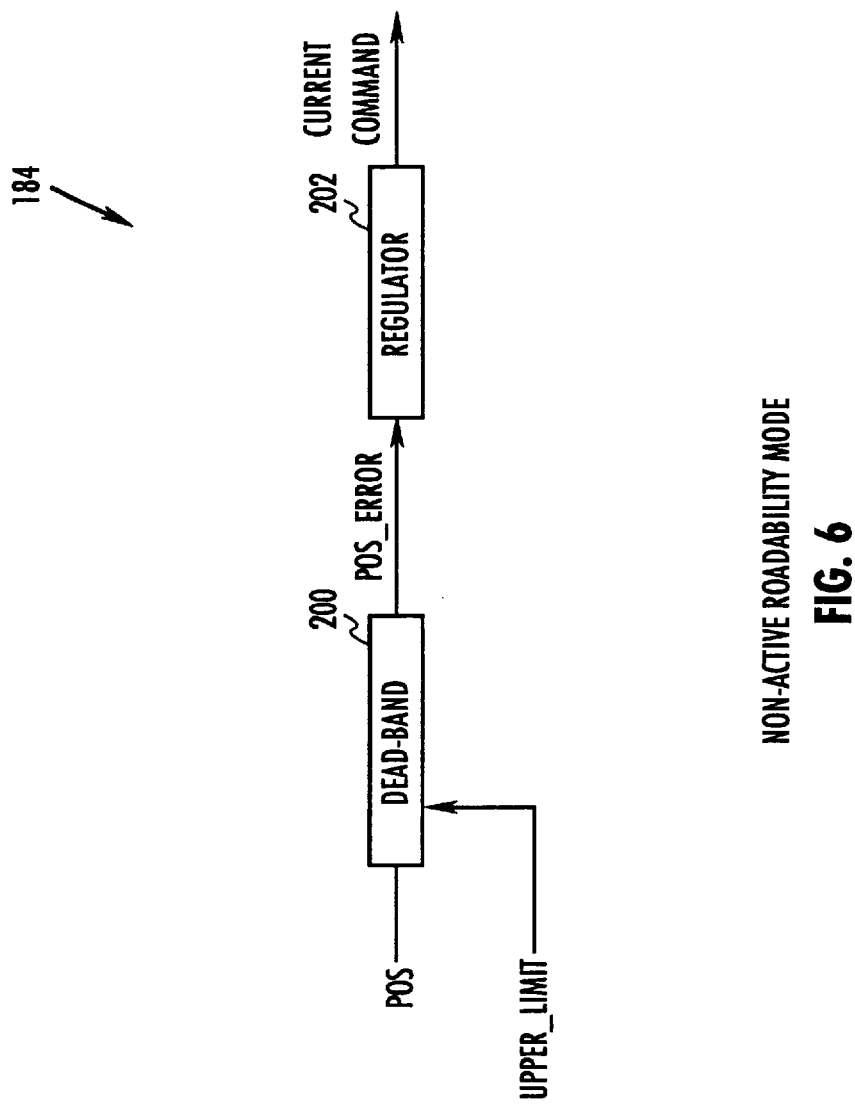
FIG. 6 is a block diagram generally representing a non-active state of roadability control mode.

The operation of control circuit 64 in the non-active state of roadability mode is described in relation to FIG. 6. Generally, control circuit 64 generates control signals applied to valving 34 via conductor 100 to move actuator 36 based upon a comparison between sensed implement position and a neutral position. In particular, control circuit 64 commands implement 44 to a position within a zone or dead-band region of the neutral position. The position of implement 44 is converted into a position error at block 200 using the following equations:

If (pos>upper_limit), then pos_error=pos-upper_limit;

If (pos<lower_limit), then pos_error=lower_limit-pos;

where "pos" is sensed implement position, "upper_limit" is the limit value set by manipulation of command device 70, and "lower_limit," preferably set at a predetermined distance below the upper limit, such as 8 degrees below the upper limit. Alternatively, the position error value may be calculated based upon a neutral implement position and a deadband, such as of 3 degrees on either side of the neutral. For example, control circuit 64 can be configured to generate a control signal and apply the signal to valving 34 only when the implement position differs from the neutral position by more than a predetermined amount (e.g., control circuit 64 outputs no current to valving 34 when implement position is within the dead-band of the neutral position). The above equations result in setting the term "pos_error" to the absolute value of the difference between "pos" and the upper and lower limit positions. The position error is regulated at block 202 to form a command to actuator valve 34 such as a current command. While various transfer functions may be envisioned for block 202, in the presently preferred embodiment, block 202 is applies a linear gain to the position error. The command results in implement 44 moving towards the neutral position since implement 44 is lowered when the first equation is true, and implement 44 is raised when the second equation is true. Under all conditions of roadability mode, hitch assembly 38 is not commanded to move outside a zone between the maximum upper limit and a lower limit ("lower_limit") below the upper limit. If the implement command is below the lower limit, the output command to valving 34 is stopped.

Figure 7:
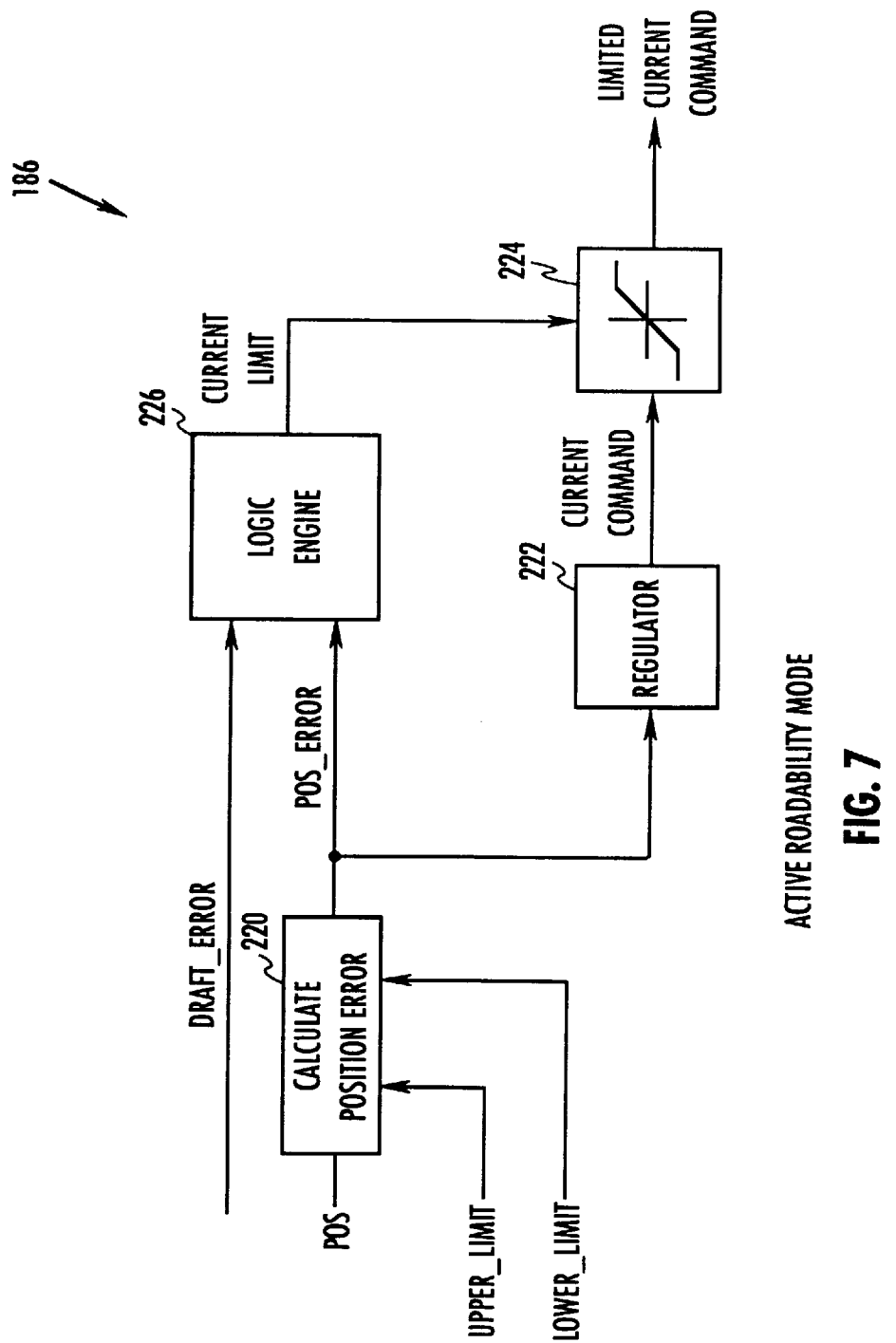
FIG. 7 is a block diagram generally representing an active state of roadability control mode.

The operation of control circuit 64 in the active state 186 of roadability mode is described in relation to FIG. 7. Generally, in active state 186, control circuit 64 regulates the movement of implement 44 within a region of a neutral position based upon the magnitude of implement oscillations and rate limits the output control signals to limit such oscillations. In particular, control circuit 64 commands implement 44 to a position within a lower limit and an upper limit by calculating a position error at block 220 using the following equations:

for raise: pos_error=upper_limit-pos;

for lower: pos_error=pos-lower_limit;

where "pos_error", "pos", "upper_limit" and "lower_limit" are defined above. A regulator 222 converts position error to a control signal such as a current command using a control algorithm such as a multiplication gain function. The current command is rate limited or clipped at block 224 to form a limited current command applied to actuator valve 34. The current limit for rate limit 224 is calculated as a function of position error and total draft error at block 226.

Block 226 is a logic engine which may be implemented in a number of ways. In the presently preferred embodiment, block 226 calls upon a look-up table relating error to a current limit. Alternatively, however, techniques for generating a current limit value may implement other preset algorithms or may be based on a fuzzy logic approach. Such logic typically includes membership functions for classifying and assigning values to input parameters, fuzzy logic rules for converting the parameters to output values, and de-fuzzification membership functions for converting the output values to an output signal. Various control design packages are available to permit the establishment of effective membership functions and fuzzy logic rules without undue experimentation. Such functions may, by way of example, classify the implement into weight classes and categorize the magnitude of draft error and position error. Alternatively, conventional means may be used to set a control signal output limit, such as an operator adjustable potentiometer. Moreover, where system simplification is desirable, a fixed output limit may be provided through the control routine stored in memory circuit 108. By limiting the maximum current supplied to actuator valve 34, control circuit 64 limits the maximum rate of movement of hitch assembly 38 and allows control circuit 64 to reduce oscillations of implement 44 by damping the response of implement 44 to the oscillations.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, the various flow charts and block diagrams only generally represent the steps and blocks used in the present invention. Different implementations of hardware and software that fall within the scope of the appended claims would be apparent to a person of skill in the art.

What is claimed is:

1. A system for reducing oscillations of an implement carried by a vehicle in a desired neutral lifted position during travel, the implement coupled to an implement positioning system for including an actuator for moving the implement in response to a control signal, the system comprising:

at least one sensor configured to generate an oscillation signal representative of sensed oscillation of the implement about the desired neutral position while the implement is in the lifted position during travel; and a control circuit coupled to the at least one sensor, and the actuator, the control circuit configured to generate the control signal for moving the actuator to reduce oscillation of the implement by moving the implement relative to the desired neutral position of the implement.

2. The system of claim 1 wherein the actuator can selectively raise and lower the implement.

3. The system of claim 1 wherein the control signal regulates raising and lowering of the implement by changes in an electrical current.

4. The system of claim 1 wherein the at least one sensor is a draft load sensor for sensing force generated by interaction of the implement with the ground when the implement is in a working position.

5. The system of claim 1 wherein the control circuit includes a programmed microprocessor.

6. The system of claim 1 including:

a position sensor configured to generate a position signal representative of implement position; and a load sensor configured to generate a load signal representative of load exerted by the implement on the implement positioning system, wherein the control circuit is configured to operate in a first manner in which the control circuit generates the control signal for moving the actuation based at least upon the position signal and a second manner in which the control circuit generates the control signal for moving the actuator based at least upon the load signal; and wherein, when the control circuit is operating in the first manner, the control circuit generates the control signal based upon a comparison between sensed implement position and a neutral position.

7. The system of claim 6 wherein the control circuit generates the control signal to move the implement to a position within a dead-band surrounding the neutral position.

8. The system of claim 6 wherein the control circuit generates the control signal when the implement position differs from the neutral position by more than a predetermined amount.

9. The system of claim 1 including:

a position sensor configured to generate a position signal representation of implement position; and a load sensor configured to generate a load signal representative of load exerted by the implement on the implement positioning system, wherein the control circuit is configured to operate in a first manner in which the control circuit generates the control signal for moving the actuation based at least upon the position signal and a second manner in which the control circuit generates the control signal for moving the actuator based at least upon the load signal; and wherein the control circuit transitions from the first manner to the second manner of operation upon detecting oscillations of the implement beyond a predetermined magnitude.

10. The system of claim 1 wherein the control circuit is configured to generate a weight signal representative of the weight of the implement from output of the at least one sensor.

11. The system of claim 10 including:

a position sensor configured to generate a position signal representation of implement position; and a load sensor configured to generate a load signal representative of load exerted by the implement on the implement positioning system, wherein the control circuit is configured to operate in a first manner in which the control circuit generates the control signal for moving the actuation based at least upon the position signal and a second manner in which the control circuit generates the control signal for moving the actuator based at least upon the load signal; and wherein the control circuit determines a load error based upon a difference between the load signal and the implement weight, and wherein transition from the first manner to the second manner of operation is dependent at least upon the load error exceeding a minimum value.

12. The system of claim 1 wherein said at least one sensor includes a first load sensor configured to sense load exerted by the implement on a right side of the implement positioning system and a second load sensor configured to sense load on the left side of the implement positioning system.

13. The system of claim 12 including:

a position sensor configured to generate a position signal representation of implement position; and a load sensor configured to generate a load signal representative of load exerted by the implement on the implement positioning system, wherein the control circuit is configured to operate in a first manner in which the control circuit generates the control signal for moving the actuation based at least upon the position signal and a second manner in which the control circuit generates the control signal for moving the actuator based at least upon the load signal; and wherein transition from the first manner to the second manner of operation is dependent at least upon both right and left sensed implement loads increasing or decreasing at the same time.

14. The system of claim 1 including:

a position sensor configured to generate a position signal representation of implement position; and a load sensor configured to generate a load signal representative of load exerted by the implement on the implement positioning system, wherein the control circuit is configured to operate in a first manner in which the control circuit generates the control signal for moving the actuation based at least upon the position signal and a second manner in which the control circuit generates the control signal for moving the actuator based at least upon the load signal; and wherein, when the control circuit is operating in the second manner, the control circuit regulates the movement of the implement within a region of a neutral position based upon a magnitude of implement oscillations.

15. The system of claim 1 including:

a position sensor configured to generate a position signal representation of implement position; and a load sensor configured to generate a load signal representative of load exerted by the implement on the implement positioning system, wherein the control circuit is configured to operate in a first manner in which the control circuit generates the control signal for moving the actuation based at least upon the position signal and a second manner in which the control circuit generates the control signal for moving the actuator based at least upon the load signal; and wherein, when the control circuit is operating in the second manner, the control circuit limits the control signal to the actuator, thereby limiting the response rate of the actuator.

16. The system of claim 15 wherein the control circuit generates a weight signal representative of the weight of the implement from output of the at least one sensor, and the control circuit limits the control signal using a load error based upon a difference between the sensed implement load and implement weight.

17. The system of claim 16 wherein the control signal is based upon the sensed implement position.

18. The system of claim 1, wherein the at least the one sensor includes at least one load sensor configured to generate a load signal representative of load exerted by the implement on the implement positioning system, wherein the control circuit generates the control signal for moving the actuator based at least upon the load signal.

19. The system of claim 1, wherein the at least one sensor includes at least one position sensor configured to generate a position signal representative of implement position, wherein the control circuit generates the control signal for moving the actuator based at least upon the position signal.

20. The system of claim 1, wherein the at least one sensor includes:

a load sensor configured to generate a load signal representative of load exerted by the implement on the implement positioning system; and a position sensor configured to generate a position signal representative of implement position.

21. The system of claim 20, wherein the control circuit is configured to operate in a first manner to generate the control signal for moving the actuator based at least upon the position signal and a second manner to generate the control signal for moving the actuator based at least upon the load signal.

22. The system of claim 1, including a speed sensor coupled to the control circuit and configured to generate a speed signal representative of the speed of the vehicle, wherein the control circuit generates the control signal in response to the vehicle speed being greater than a predetermined threshold speed.

23. A system for improving roadability of a vehicle system including an implement carried by a vehicle in a lifted position during travel, the implement coupled to an implement positioning system including an actuator capable of vertically moving the implement in response to a control signal, the system comprising:

a position sensor configured to generate a position signal representative of the position of the implement;

a speed sensor configured to generate a speed signal representative of the speed of the vehicle; and a control circuit coupled to the position sensor, the speed sensor, and the actuator, the control circuit configured to operate in a roadability mode to generate the control signal to reduce oscillations of the implement based at least upon the implement being in the lifted position and vehicle speed being greater than a predetermined threshold speed.

24. The system of claim 23 further comprising an operator adjustable upper limit setting, wherein the lifted position of the implement for the control circuit to enter the roadability mode is in a predetermined relationship with the upper limit setting.

25. The system of claim 23 further comprising at least one load sensor for sensing load exerted by the implement on the implement positioning system, wherein the control circuit in the roadability mode detects oscillations of the implement based upon the sensed implement load.

26. The system of claim 25 wherein the control circuit limits the control signal to the actuator in response to oscillations of the implement.

27. The system of claim 23 further comprising an operator adjustable position command, wherein a further condition for entering roadability mode is the position command being in a predetermined relationship to a fully lifted position, and wherein roadability mode is exited when the position command is not in the predetermined relationship to the fully lifted position.

28. The system of claim 23 further comprising an input device including a working position and a lifting position, wherein a further condition for entering roadability mode is the input device being in the lifting position, and wherein roadability mode is exited when the input device is in the working position.

29. The system of claim 23 further comprising an operator adjustable upper limit setting, wherein a further condition for entering roadability mode is the upper limit setting being in a predetermined relationship to a fully lifted position, and wherein roadability mode is exited when the upper limit setting is not in the predetermined relationship to the fully lifted position.

30. The system of claim 23 wherein the control circuit is further configured to exit roadability mode when vehicle speed decreases below a predetermined value.

31. The system of claim 23 wherein the control circuit includes a programmed microprocessor.

32. A system for improving roadability of a vehicle carrying an implement in a lifted position during travel, the implement coupled to an implement positioning system including an actuator capable of vertically moving the implement in response to a control signal, the system comprising:

means for generating a load signal representative of the load exerted by the implement on the implement positioning system;

means for generating a speed signal representative of the speed of the vehicle;

means for generating a position signal representative of the position of the implement; and control means coupled to the load sensing means, the position sensing means, the speed sensing means and the actuator, the control means configured to generate the control signal for moving the actuator in a first manner and a second manner when the position signal and speed signal indicate that the implement is in a lifted position during travel, wherein the control means generates the control signal in the first manner when oscillations of the implement are not detected and in the second manner when oscillations of the implement are detected.

33. The system of claim 32 wherein the control means moves the implement to a neutral position when operating in the first manner.

34. The system of claim 32 wherein the control means moves the implement within a region of a neutral position using a limited control signal when operating in the second manner.

35. The system of claim 32 wherein a first load sensor senses load exerted by the implement on a right side of the implement positioning system and a second load sensor senses load exerted by the implement on a left side of the implement positioning system, and wherein oscillations of the implement are detected dependent at least upon both right and left sensed implement loads increasing or decreasing at the same time.

* * * * *